(12) United States Patent
Kaneda et al.

(10) Patent No.: US 7,639,282 B2
(45) Date of Patent: Dec. 29, 2009

(54) IMAGE SENSING DEVICE THAT ACQUIRES A MOVIE OF A PERSON OR AN OBJECT AND SENSES A STILL IMAGE OF THE PERSON OR THE OBJECT, AND CONTROL METHOD THEREOF

(75) Inventors: Yuji Kaneda, Kanagawa (JP); Masakazu Matsugu, Kanagawa (JP); Masami Kato, Kanagawa (JP); Katsuhiko Mori, Kanagawa (JP); Hiroshi Sato, Kanagawa (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 11/392,810

(22) Filed: Mar. 30, 2006

(65) Prior Publication Data

US 2006/0222214 A1    Oct. 5, 2006

(30) Foreign Application Priority Data

Apr. 1, 2005    (JP)    ............................. 2005-106801

(51) Int. Cl.
 *H04N 5/228* (2006.01)
(52) U.S. Cl. .................................. 348/222.1
(58) Field of Classification Search ............... 348/222.1, 348/231.4, 423.1, 220.1; 382/115
See application file for complete search history.

(56) References Cited

U.S. PATENT DOCUMENTS

| | | | |
|---|---|---|---|
| 5,561,796 A | * | 10/1996 | Sakamoto et al. ............... 707/3 |
| 5,589,946 A | | 12/1996 | Shimokoriyama et al. |
| 6,606,117 B1 | * | 8/2003 | Windle ........................ 348/239 |
| 7,369,685 B2 | * | 5/2008 | DeLean ....................... 382/118 |
| 7,493,559 B1 | * | 2/2009 | Wolff et al. .................. 715/727 |
| 2002/0113687 A1 | * | 8/2002 | Center et al. ................ 340/5.82 |
| 2005/0041951 A1 | * | 2/2005 | Inoue et al. .................... 386/46 |
| 2007/0025722 A1 | | 2/2007 | Matsugu et al. |

FOREIGN PATENT DOCUMENTS

JP        2002-165122        6/2002

OTHER PUBLICATIONS

"Computer Recognition of Human Face-A Survey.", Journal of Institute of Electronics, Information and Communication Engineers, vol. J80-A, No. 8, Aug. 1997; English Abstract, pp. 1215-1230.
"Recognition of Human Motion Behaviors using View-based Aspect Model based on Motion Change." Journal of Institute of Electronics, Information and Communication Engineers, vol. J84-D2, No. 10, Oct. 2001; English Abstract, pp. 2212-2223.
"A Survey on Automatic Speech Recognition", vol. J83-D2, No. 2, Feb. 2000; English Abstract, pp. 433-457.

* cited by examiner

*Primary Examiner*—Tuan Ho
*Assistant Examiner*—Kent Wang
(74) *Attorney, Agent, or Firm*—Fitzpatrick, Cella, Harper & Scinto

(57) ABSTRACT

An image sensing device collects the speech and image of a person to be sensed and carries out recognition of the collected speech. When the image sensing device determines as the recognition result that the speech represents a predetermined sentence, the image sensing device performs recognition on an acquired image. When the image sensing device determines as a recognition result that the image is a human face showing a predetermined facial expression, the image sensing device records the image and audio information.

6 Claims, 11 Drawing Sheets

IMAGE SENSING DEVICE THAT ACQUIRES A MOVIE OF A PERSON OR AN OBJECT AND SENSES A STILL IMAGE OF THE PERSON OR THE OBJECT, AND CONTROL METHOD THEREOF

FIELD OF THE INVENTION

The present invention relates to image sensing technology.

BACKGROUND OF THE INVENTION

For control of an image sensing device, technology already exists that, for example, plays back a previously registered audio signal when a shutter button is pressed and carries out imaging when playback of the audio signal ends (see Japanese Patent Laid-Open No. 2002-165122). This makes it possible to capture optimal images by indicating the timing of imaging to the subject person using sound, to thereby enable the subject person to create a facial expression that is. timed to match the end of playback of the sound.

However, in order to make imaging simpler and easier it is preferable to omit even the operation of pressing the shutter button. There are also cases in which it is desirable to image a natural facial expression or motion at a suitable timing without having to make the subject concerned about the imaging timing of the camera.

SUMMARY OF THE INVENTION

The present invention was made for the above purposes, and an object of the present invention is to provide technology for performing imaging more simply.

In order to achieve an object of the present invention, for example, an image sensing device of the present invention comprises the following arrangement.

That is, an image sensing device comprising:

first acquisition means for acquiring first imaging environment information from an imaging environment of the image sensing device;

second acquisition means for acquiring second imaging environment information from an imaging environment of the image sensing device; and imaging means for sensing an object when both the first imaging environment information and the second imaging environment information fulfill respective imaging conditions.

In order to achieve an object of the present invention, for example, an image sensing device of the present invention comprises the following arrangement.

That is, an image sensing device comprising:

sound collection means for collecting sounds in an imaging environment;

sound recognition means for recognizing a sound collected by the sound collection means;

movie acquisition means for acquires a movie of an object to be sensed;

determination means for determining whether or not the object fulfills an imaging condition based on an image of each frame of the movie acquired by the movie acquisition means; and imaging means for sensing the object when a sound collected by the sound collection means is a predetermined sound and the object fulfills an imaging condition.

In order to achieve an object of the present. invention, for example, a control method for an image sensing device of the present invention comprises the following arrangement.

That is, a control method for an image sensing device comprising:

a first acquisition step of acquiring a first imaging environment information from an imaging environment of the image sensing device;

a second acquisition step of acquiring. a second imaging environment information.from an imaging environment of the image sensing device; and an imaging step of sensing an object when both the first imaging environment information and the second imaging environment information fulfill respective imaging conditions.

In order to achieve an object of the present invention, for example, a control method for an image sensing device of the present invention comprises the following arrangement.

That is, a control method for an image sensing device comprising:

a sound collection step of collecting sounds in an imaging environment;

a sound recognition step of recognizing a sound collected in the sound collection step;

a movie acquisition step of acquiring a movie of an object to be sensed;

a determination step for determining whether or not the object fulfills an imaging condition based on an image of each frame of a movie acquired in the movie acquisition step; and an imaging step of sensing the object when a sound collected in the sound collection step is a predetermined sound and the object fulfills an imaging condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the following embodiments, an image sensing device is described which acquires first imaging environment information and second imaging environment information from the ambient environment (imaging environment) of the image sensing device, and first starts imaging when the acquired first imaging environment information and second imaging environment information fulfill a predetermined condition. Although examples of the first imaging environment information and second imaging environment information are given hereunder, it will be understood from the following description that the first imaging environment information and second imaging environment information are not limited to these examples.

First Embodiment

Figure 1:
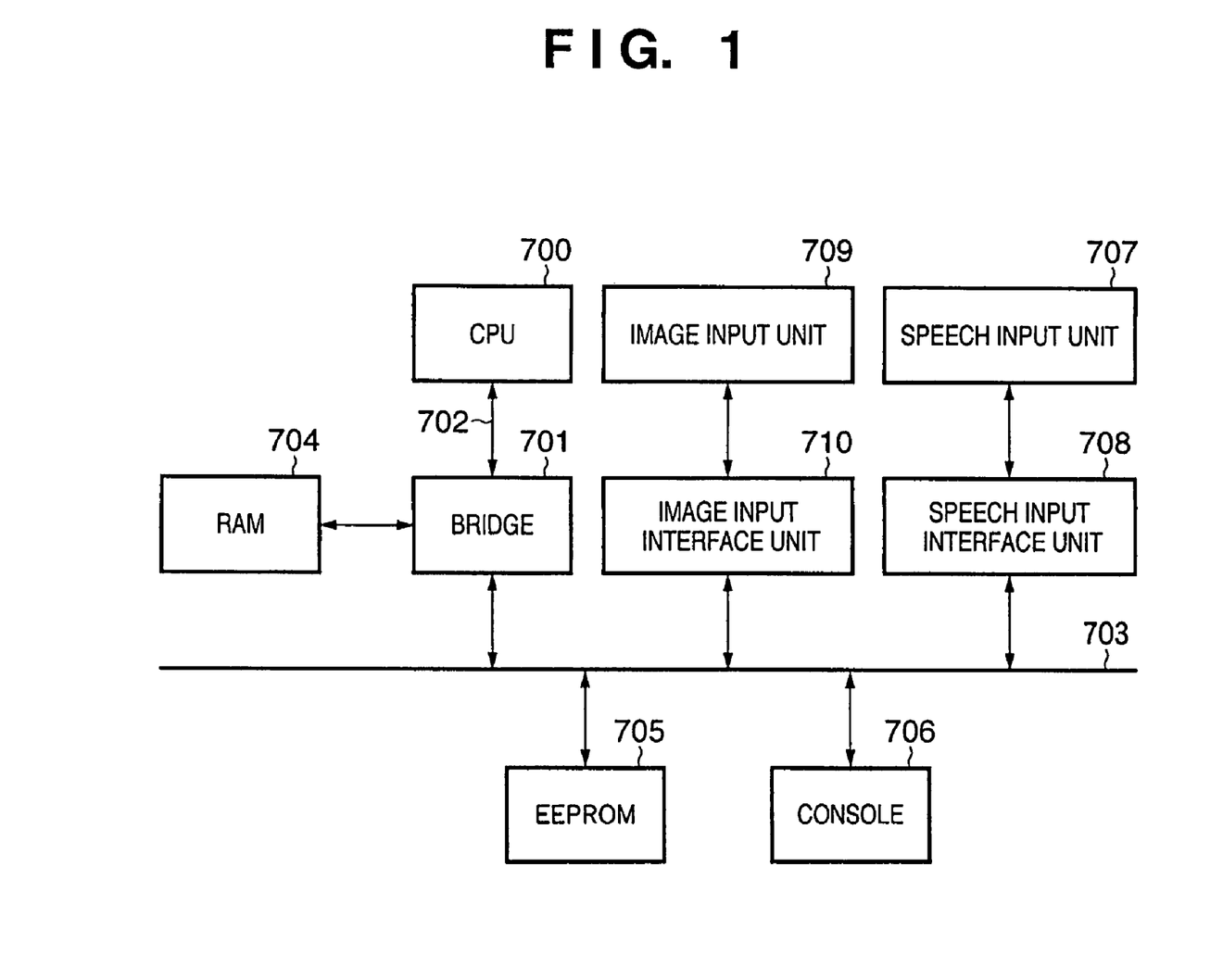
FIG. 1 is a block diagram showing the hardware configuration of an image sensing device according to the first embodiment of this invention.

FIG. 1 is a block diagram showing the hardware configuration of the image sensing device according to this embodiment. As shown in FIG. 1, the image sensing device of this embodiment is composed by a CPU 700, a bridge 701, a CPU bus 702, a RAM 704, an image input unit 709, an image input interface unit 710, a speech input unit 707, a speech input interface unit 708, an EEPROM 705, a console 706, and a system bus 703. First, these units will be briefly described.

The CPU 700 carries out overall control of the image sensing device using data and programs stored in the RAM 704 and EEPROM 705, and also executes various processes performed by the image sensing device that are described later.

The bridge 701 is a device for connecting the CPU bus 702 which performs data transfer at a relatively high speed and the system bus 703 which performs data transfer at a low speed compared to the CPU bus 702. The bridge 701 also has a memory controller function, and a DMA (Direct Memory Access) function that carries out access control to the RAM 704 that is connected to the bridge 701.

The RAM 704 is composed by a large capacity high speed memory such as a SDRAM (Synchronous DRAM), a DDR (Double Data Rate), or a RDRAM (Rambus DRAM). It includes an area for temporarily storing programs or data, as well as a work area that is used when the CPU 700 executes various processes.

The EEPROM 705 stores programs or data for causing the CPU 700 to execute various processes to be described later, and also includes an area for temporarily storing various data. Captured images and sounds are recorded as data in this area.

The console 706 functions as an operations interface that can input various instructions to the CPU 700 by operations performed by the operator of the image sensing device. The console 706 is equipped with an operation button. By pressing the operation button the operator starts operation of the image input unit 709 and the speech input unit 707 to begin input of images and sound.

The image input unit 709 includes a photoelectric conversion device such as a CCD (Charge-Coupled Device) or CMOS (Complimentary Metal Oxide Semiconductor) sensor, a driver circuit that controls the photoelectric conversion device, and a signal processing circuit that controls various kinds of image correction processing. The image input unit 709 according to this configuration images a dynamic image in real space and outputs image signals of each frame of the imaged dynamic image to the image input interface unit 710.

The image input interface unit 710 converts the image signals of each frame that are output from the image input unit 709 into digital image data and carries out buffering. It then transfers the data sequentially to, for example, a predetermined address on the RAM 704 using the DMA function of the bridge 701.

The speech input unit 707 is, for example, a microphone, and it collects sounds in the area around the image sensing device and outputs the sounds to the speech input interface unit 708 as analog signals. The speech input interface unit 708 converts the audio signals to digital audio data and carries out buffering. It then transfers the data sequentially to, for example, a predetermined address on the RAM 704 using the DMA function of the bridge 701.

The case of imaging a subject (in this example, a human is taken as the subject) using the image sensing device having the above described configuration will now be described in brief. When the operator of the image sensing device operates the console 706 to begin operation of the image input unit 709 and the speech input unit 707, as described above, image data and audio data for each frame is stored in sequence in the RAM 704.

The CPU 700 sequentially checks the image data and audio data stored in the RAM 704, and when one of these data fulfills a predetermined imaging condition, that is, when an imaging intention is recognized by the subject (imaging object), the CPU 700 shifts to a preparatory state for imaging. Further, when the other data fulfills a predetermined imaging condition, that is, when an imaging instruction is recognized, the image data and audio data that are referred to at this time are transferred to the EEPROM 705. It is thus possible to image the image at the time the imaging instruction is made (in this case, the term "to image" refers to recording an image on the EEPROM 705), and also to record the audio data at that time.

Figure 2:
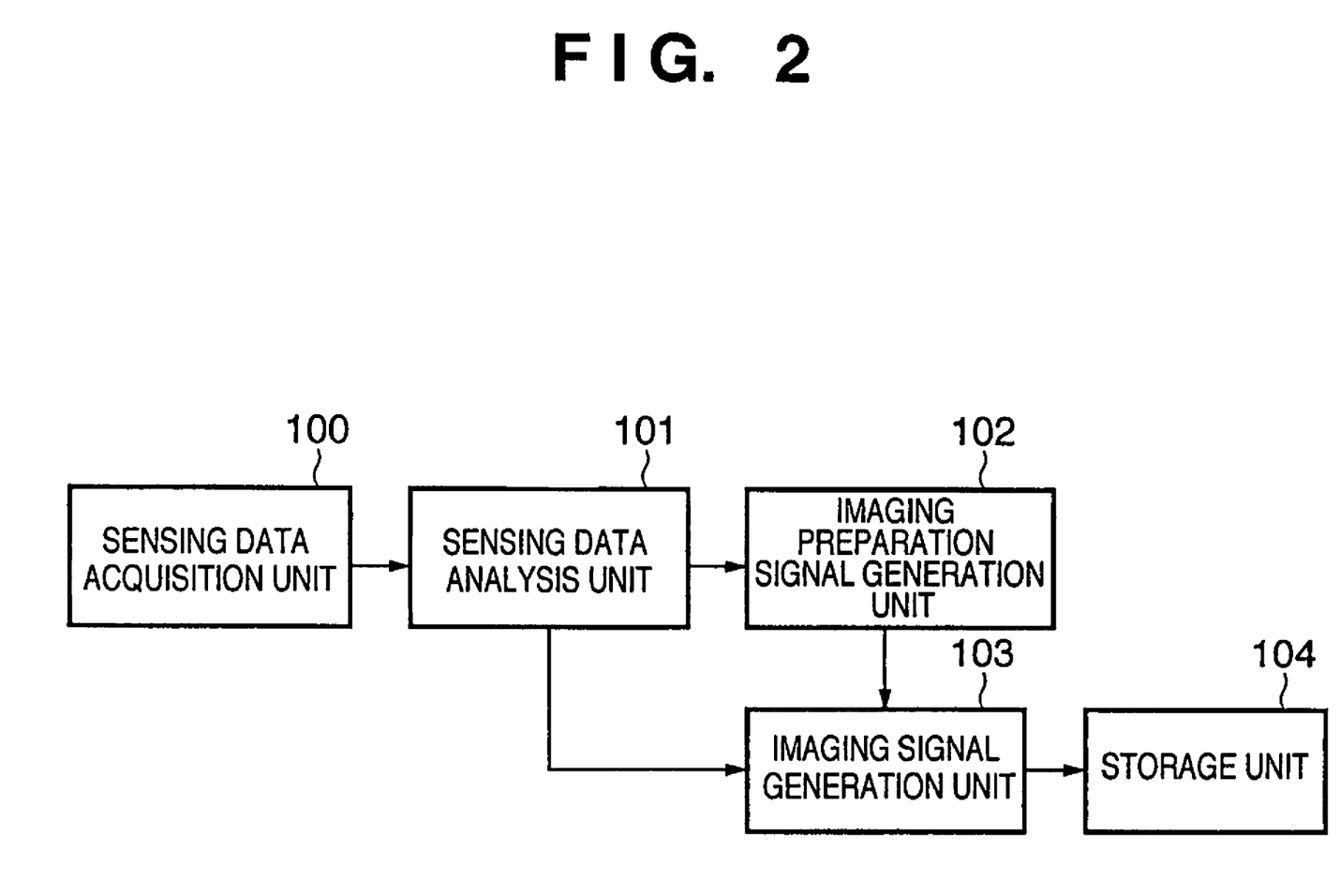
FIG. 2 is a block diagram showing the functional configuration of the image sensing device.

FIG. 2 is a block diagram showing the functional configuration of the image sensing device. A sensing data acquisition unit 100 acquires digital image data that is obtained by analog to digital conversion of image signals obtained from an image-forming optical system and a solid-state image pickup device, and digital audio data that is obtained by converting sounds obtained from a microphone into electrical signals.

A sensing data analysis unit 101 performs various kinds of recognition processing, as described later, for images and sounds acquired by the sensing data acquisition unit 100. The sensing data analysis unit 101 may be composed by, for example, dedicated hardware such as FPGA (Field Programmable Gate Array) and ASIC (Application Specific Integrated Circuit).

Figure 3:
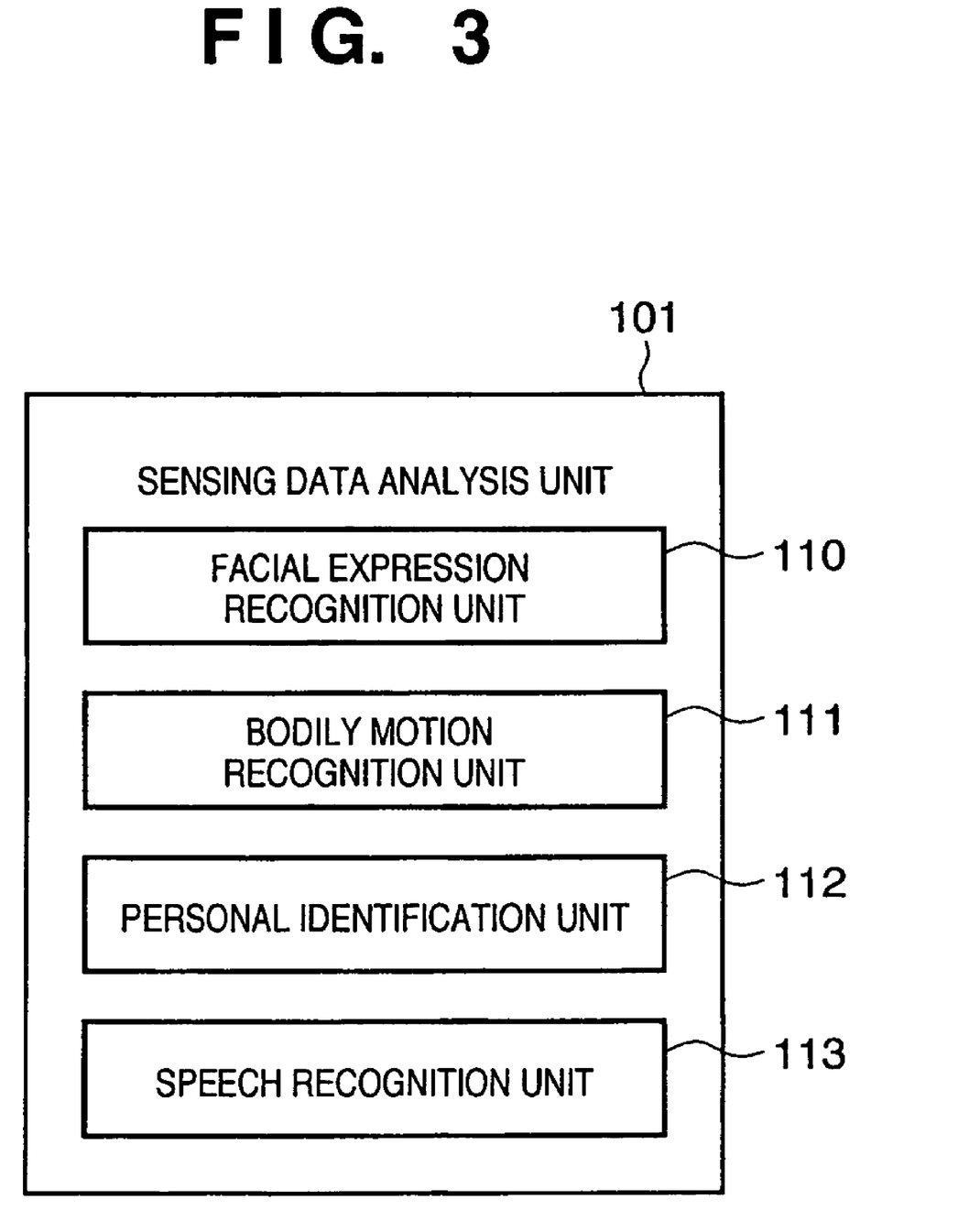
FIG. 3 is a block diagram showing the functional configuration of a sensing data analysis unit.

FIG. 3 is a block diagram showing the functional configuration of the sensing data analysis unit 101. As shown in FIG. 3, the sensing data analysis unit 101 is composed by a facial expression recognition unit 110, a bodily motion recognition unit 111, a personal identification unit 112, and a speech recognition unit 113. More specifically, the sensing data analysis unit 101 is composed by a section (facial expression recognition unit 110, bodily motion recognition unit 111, personal identification unit 112) that performs recognition processing using image information, and a section that performs recognition processing using audio information (speech recognition unit 113).

The recognition using image information includes personal recognition, recognition of a bodily motion such as a gesture or hand movement, and recognition of a facial expression.

Figure 5:
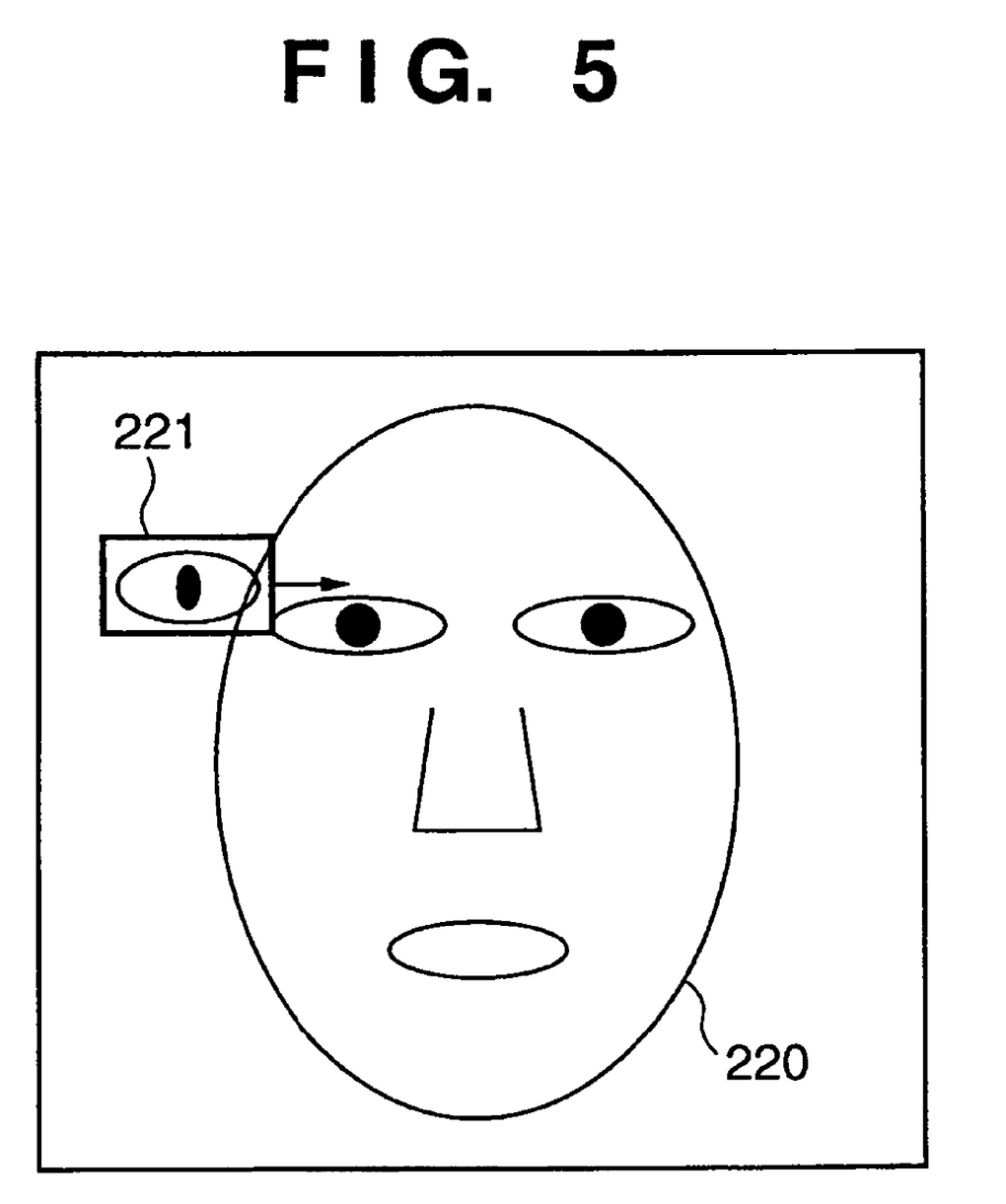
FIG. 5 is a view showing an example of an image used for explaining personal recognition processing.

First, personal recognition processing will be described. FIG. 5 is a view showing an example of an image used for explaining personal recognition processing. Recognition of a person is performed, for example, by performing a flesh color search for an image, determining eye and mouth candidates by a matching process that uses an eye template 221 and a mouth template within a flesh color range 220, and then detecting eye and mouth positions from the spatial arrangement relationship of the respective candidate positions, that is, the facial positions. Next, a number of feature points are set based on the eye and mouth positions and, as described in "Computer Recognition of Human Face—A Survey.", Journal of Institute of Electronics, Information and Communication Engineers, Vol. J80-A, No. 8, pp. 1215-1230, August 1997, a method can be performed which identifies an individual by performing a Gabor wavelet transformation for those feature points to extract a feature value, such as the localized periodicity or orientation of a pattern, and compares the feature value with data registered in advance. The personal identification unit 112 performs this kind of personal recognition processing. In this connection, a personal recognition method is not limited to the method described above.

Figure 6:
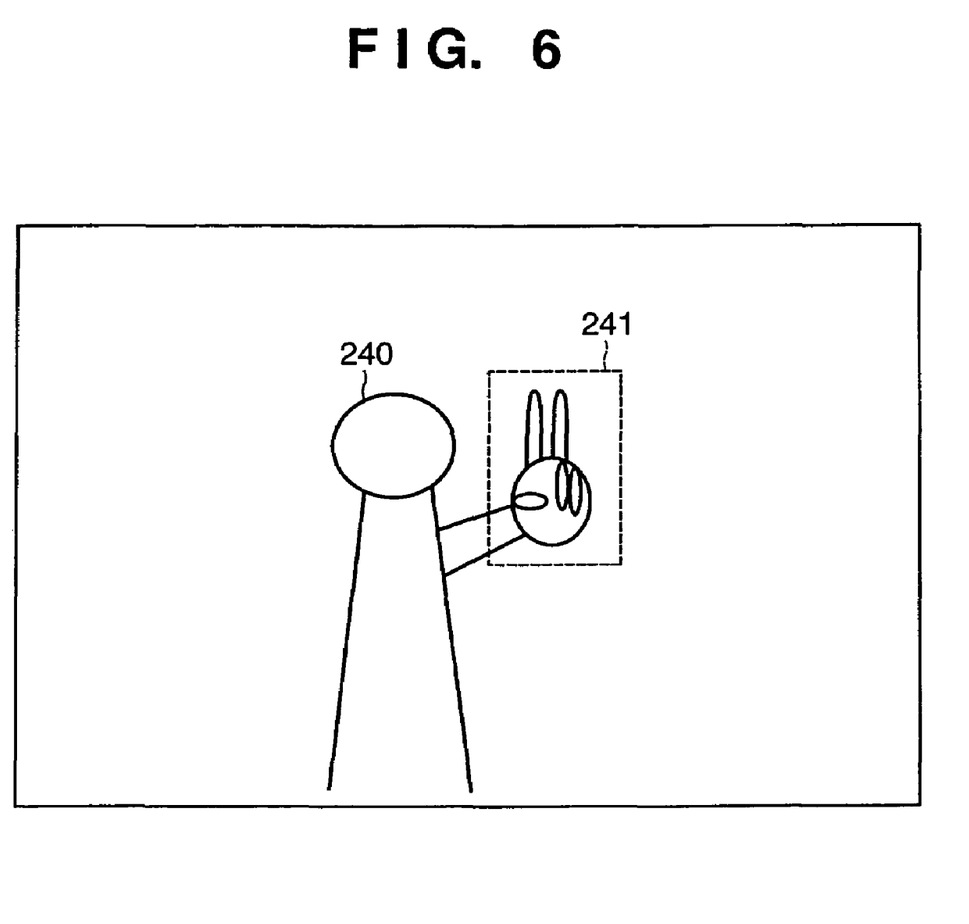
FIG. 6 is a view showing an example of an image used for explaining bodily motion recognition processing.
Figure 7:
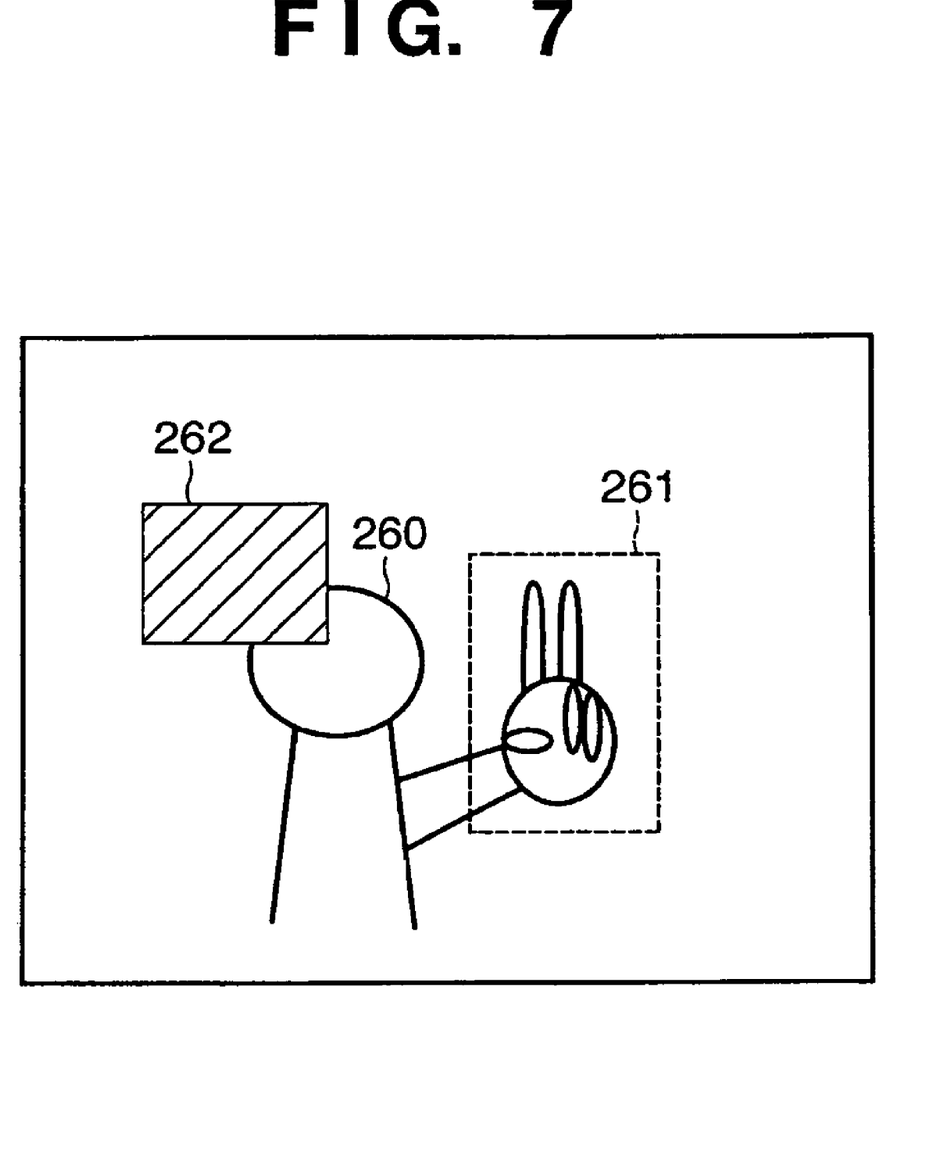
FIG. 7 is a view showing an example of an image used for explaining bodily motion recognition processing.

Next, bodily motion recognition will be described. FIGS. 6 and 7 are views showing examples of an image used for explaining bodily motion recognition processing. A method exists which, when a subject 240 makes a hand sign 241 as shown in FIG. 6, recognizes a hand sign 261 of the subject using a template 262 that, as shown in FIG. 7, takes as a reference the position at which a human face 260 was detected, to detect a hand sign from the peripheral region thereof. Further, the technology for recognizing a gesture or hand movement or the like includes the technology described in "Recognition of Human Motion Behaviors using View-based Aspect Model based on Motion Change." Journal of Institute of Electronics, Information and Communication Engineers, Vol. J84-D2, No. 10, pp. 2212-2223, October 2001, and the like. In this connection, the bodily motion indicated in this case may be the shape of a specific body member at a certain instant, such as a pose or may be a consecutive series of movements, such as a gesture or hand movements. The bodily motion recognition unit 111 performs this kind of bodily motion recognition processing. In this connection, a bodily motion recognition method is not limited to the method described above.

Figure 8:
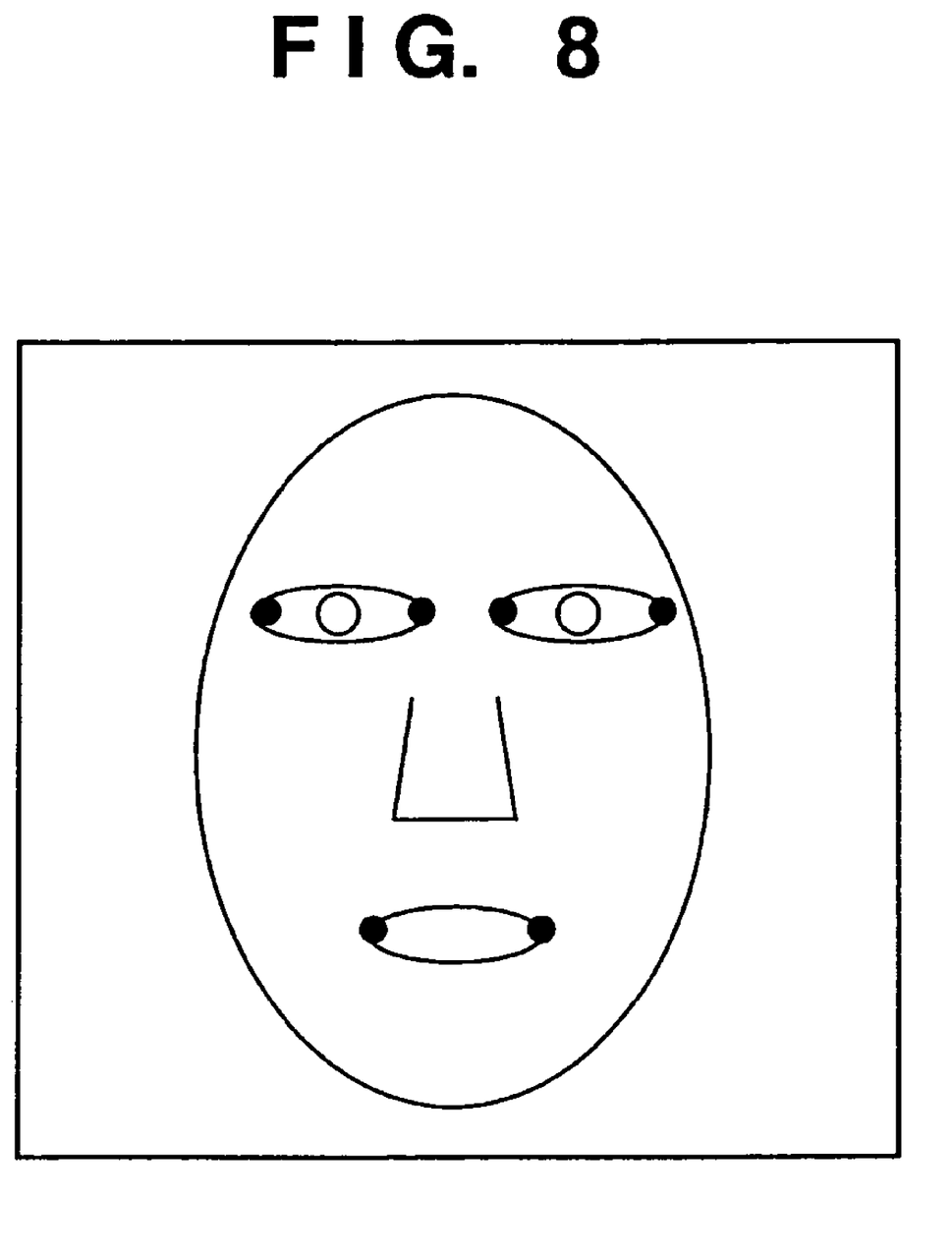
FIG. 8 is a view showing an example of an image used for explaining processing for recognition of a facial expression.

Next, processing for recognition of a facial expression will be described. FIG. 8 is a view showing an example of an image used for explaining processing for recognition of a facial expression. As described in, for example, "Recognition of Facial Expressions by Human and Computer III—The State of the Art in Facial Expression Analysis 2: Recognition of Facial Actions—", Journal of Institute of Electronics, Information and Communication Engineers, Vol. 85, No. 12, pp. 936-941, December 2002, recognition of a facial expression can be carried out by a method whereby, after extracting a plurality of feature points, such as the outer corners of the eyes, the inner corners of the eyes, and the edges of the mouth that are within a peripheral range of the respective eye and mouth positions based on the eye and mouth positions shown in FIG. 8, feature parameters are calculated that describe variations in the shape or arrangement of the facial features, and an input layer into which the feature parameters are input and a neural network that outputs the presence or absence of a detection of an Action Unit as proposed in P. Ekman and W. V. Friesen's "Facial Action Coding System (FACE)," Consulting Psychologists Press, 1978, are prepared to perform recognition of facial expressions. A facial expression other than a human emotion, such as closed eyes, may also be recognized. The facial expression recognition unit 110 performs this kind of processing. In this connection, the processing for recognition of a facial expression is not limited to these methods and another method may be used.

As described in the foregoing, the facial expression recognition unit 110, the bodily motion recognition unit 111 and the personal identification unit 112 perform recognition processing, respectively, based on image information. In this connection, all of the pixels comprising the image may not be used in the recognition processing based on image information described above. For example, a thumbnail image can be generated by skipping every second pixel, and since the number of pixels referred to for recognition processing is less than the original image, recognition processing can be performed more quickly by using this thumbnail image for the recognition processing.

Figure 4:
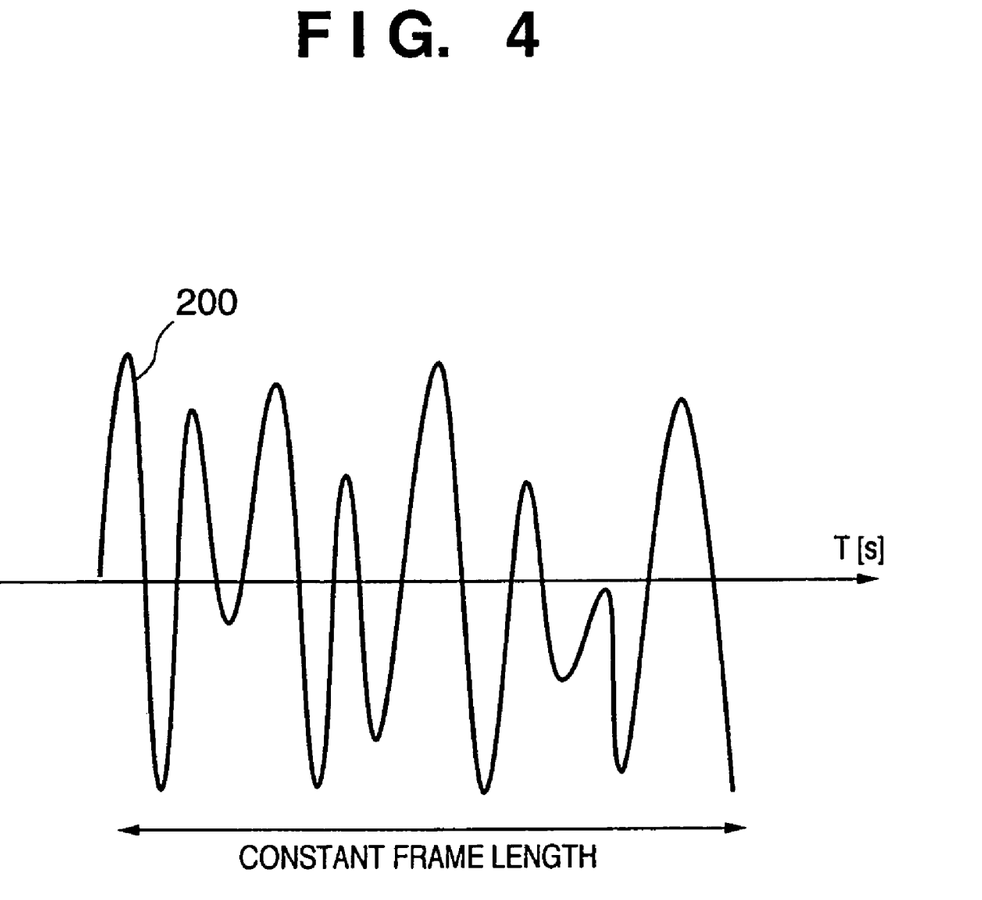
FIG. 4 is a view showing an example of a speech waveform used for explaining a speech recognition process.

Next, recognition processing using audio information will be described. FIG. 4 is a view showing an example of a speech waveform used for explaining a speech recognition process. For an audio signal 200 of a constant frame length that is obtained between a time t[s] and t+1[s], as shown in FIG. 4, a method already exists that, by use of a probability model using HMM (Hidden Markov Model) or the like, recognizes a word or sentence comprising a phoneme such as "a" or "e" and a specific speaker, as described in "A Survey on Automatic Speech Recognition", Vol. J83-D2, No. 2, pp. 433-457, February 2000. For example, the method may determine whether or not the obtained audio information is the sentence "Start imaging please." In this connection, any kind of recognition processing may be used as the speech recognition processing, and recognition of a word or sentence comprising a phoneme or other phrase such as "okay!!" or recognition of a specific speaker may be performed. The speech recognition unit 113 performs this kind of speech recognition processing.

Reverting to FIG. 2, when the sensing data analysis unit 101 completes the above described recognition processing, as the recognition result, the sensing data analysis unit 101 determines whether or not an imaging intention from the subject was recognized (the term "imaging intention" refers to the subject's own intention to the effect that the subject wants imaging to be performed from that time on). When an imaging intention was recognized, the sensing data analysis unit 101 instructs an imaging preparation signal generation unit 102 so as to generate an imaging preparation signal. The imaging preparation signal generation unit 102 outputs an imaging preparation signal to an imaging signal generation unit 103 in accordance with this instruction.

The imaging preparation signal corresponds to a control signal that is conventionally generated in a camera when the camera's shutter button is half-pressed. For example, the imaging preparation signal corresponds to an AF or AE operation control signal or a control signal for storing image sensor data in a buffer memory or the like.

After the sensing data analysis unit 101 recognizes an imaging intention and performs the above described recognition processing for images or sound acquired by the sensing data acquisition unit 100, the sensing data analysis unit 101 then determines whether or not an imaging instruction from the subject was recognized. When an imaging instruction was recognized, it instructs the imaging signal generation unit 103 to generate an imaging signal. When the imaging signal generation unit 103 receives this instruction and also receives an imaging preparation signal from the imaging preparation signal generation unit 102, it generates an imaging signal to instruct a storage unit 104 to store the image and sound that was used for the recognition. Upon receiving this instruction, the storage unit 104 stores the indicated image and sound.

The imaging signal corresponds to a control signal that is conventionally generated in a camera when the camera's shutter button is pressed. In this embodiment it causes, for example, image data and an audio signal to be stored in a memory or the like for an instant in which the subject smiles.

In this connection, although the storage unit 104 corresponds to, for example, a flash memory, it is not limited thereto.

Figure 10:
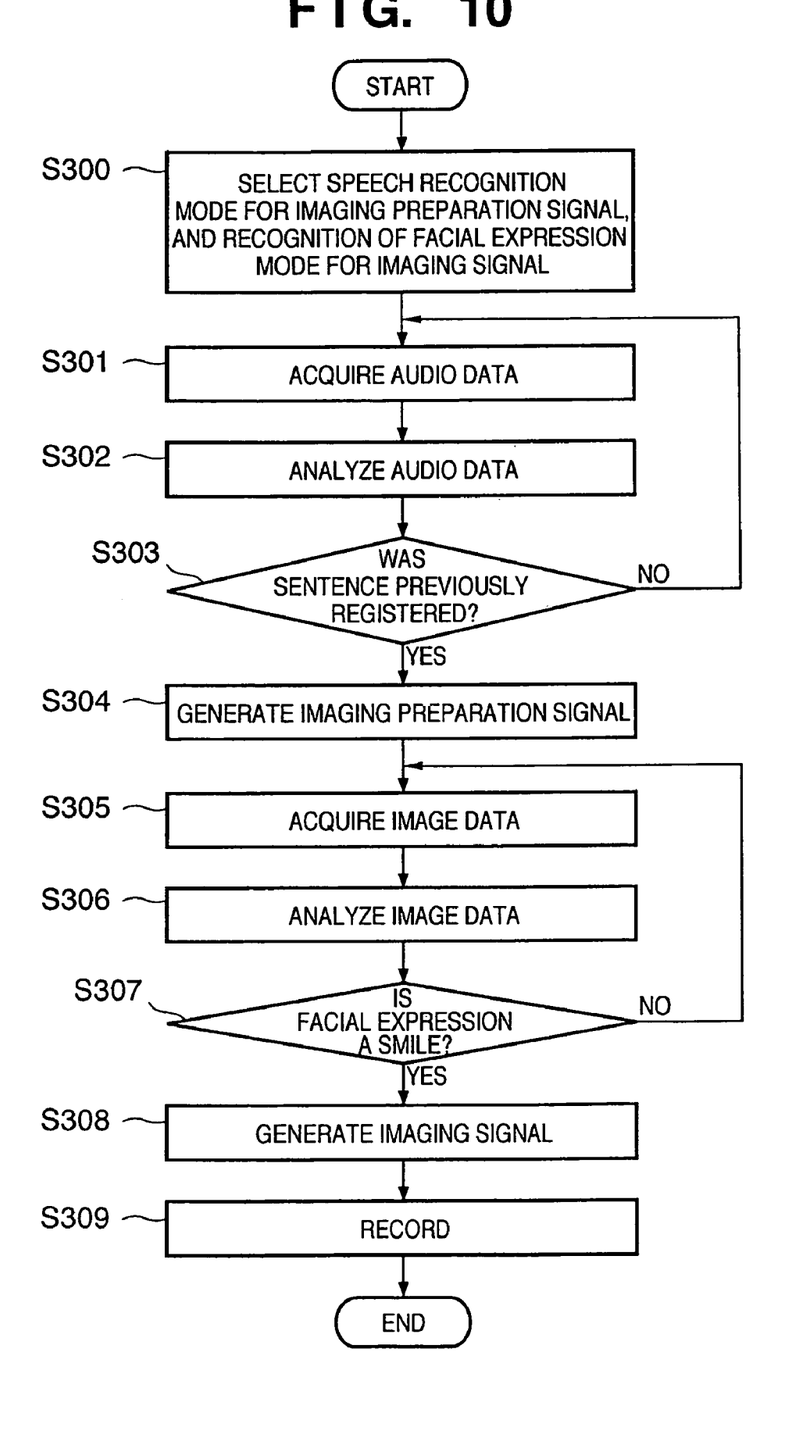
FIG. 10 is a flowchart illustrating a series of processing that an image sensing device carries out to image a subject.

FIG. 10 is a flowchart illustrating a series of processing operations that the image sensing device carries out to image a subject. Programs and data for causing the CPU 700 to execute processing in accordance with the flowchart of FIG. 10 are stored in the EEPROM 705, and by the CPU 700 using these to carry out processing, the image sensing device according to the present embodiment executes the various processes described hereunder.

Figure 9:
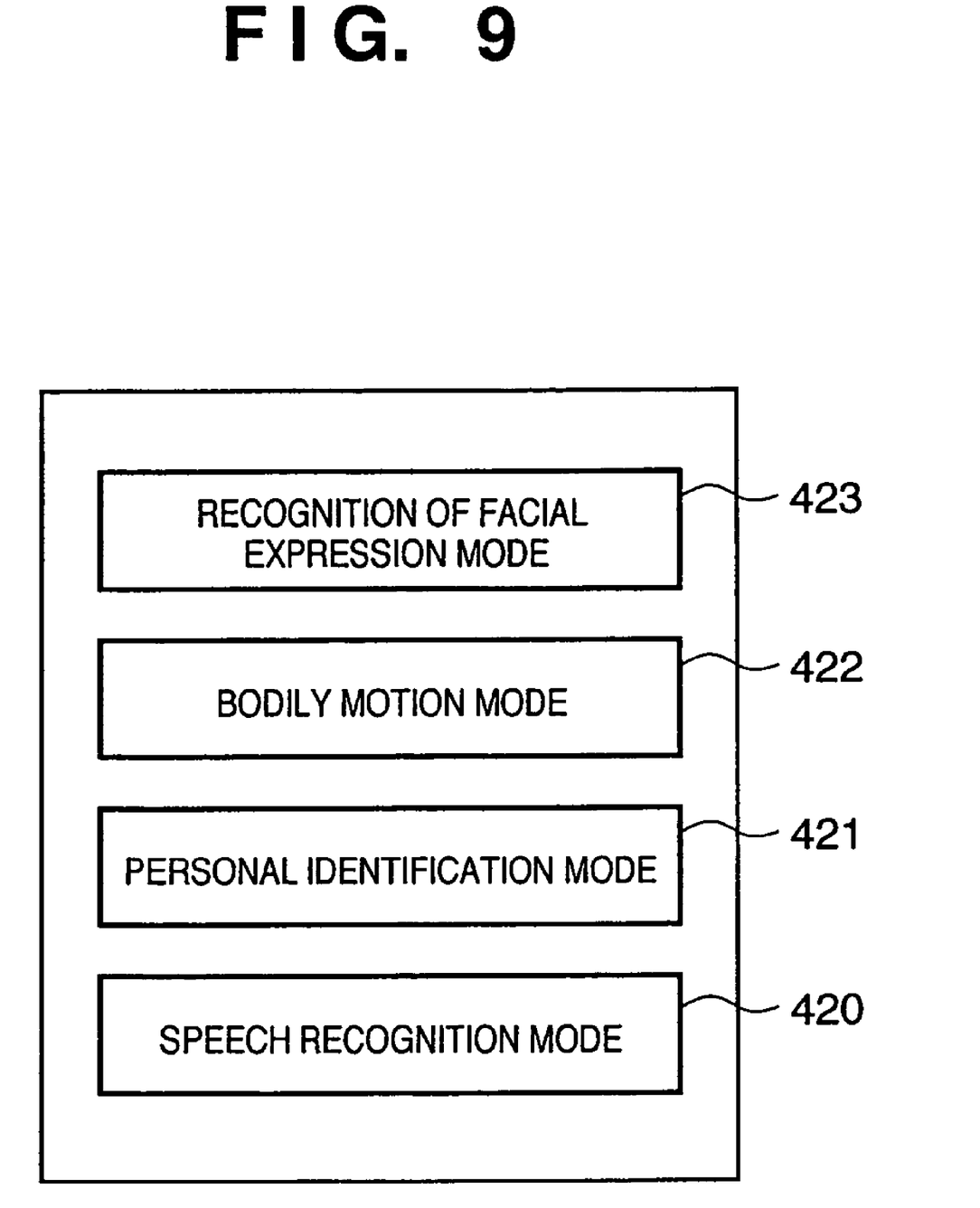
FIG. 9 is a view showing a display example of a mode selection screen.

According to the flowchart of FIG. 10, the operator of the image sensing device operates the console 706 to select a mode for shifting to the above described preparatory state for imaging, or a mode for shifting from the preparatory state for imaging to a state of actual imaging. For example, a liquid crystal display is provided on the console 706 and a graphical user interface (GUI) as shown in FIG. 9 is displayed thereon to allow selection of a mode. A selection method may involve, for example, employing a touch panel format for this liquid crystal display to allow the operator to touch a desired mode that is displayed on the liquid crystal display, or a set of buttons may be provided on the console 706 to allow selection using the buttons. FIG. 9 is a view showing a display example of the mode selection screen, by which the speech recognition mode is selected for shifting to the above described preparatory state and the recognition of facial expression mode is selected for shifting from the preparatory state for imaging to the state of actual image.

When the CPU 700 detects a selection instruction for the aforementioned modes, the CPU 700 temporarily stores the data of each set mode in the RAM 704 (step S300).

Next, since the speech recognition mode is selected, the CPU 700 controls the speech input unit 707 to start speech acquisition (step S301). As a result, audio information surrounding the image sensing device is input to the speech input interface unit 708 as audio signals from the speech input unit 707, and the speech input interface unit 708 converts these audio signals into digital audio data and outputs the digital audio data to the RAM 704.

The CPU 700 performs the above described speech recognition processing on this audio data that was acquired by the RAM 704 (step S302) and determines whether or not speech that was uttered by the subject utters a predetermined sentence (a sentence conforming to text data that was previously registered as data in the EEPROM 705) such as, for example, "Start imaging please" (step S303).

When the CPU 700 determines that the subject did not utter the predetermined sentence, it returns the process to step S301 to repeat the subsequent processing. In contrast, when the CPU 700 determines that the subject uttered the predetermined sentence, it advances the process to step S304 in which the CPU 700 generates an imaging preparation signal to place the image sensing device in a preparatory state for imaging. The processing for placing the image sensing device in a preparatory state for imaging is as described above.

Next, the CPU 700 controls the image input unit 709 to start acquisition of images (step S305). As a result, a dynamic image of real space is input into the image input interface unit 710 as an image signal in frame units from the image input unit 709. The image input interface unit 710 converts this image signal into digital image data and outputs the digital image data to the RAM 704.

The CPU 700 then performs the above described recognition processing on this image data (step S306). In this example, since the recognition of facial expression mode has been set, the CPU 700 performs recognition of the facial expression of the subject in the image (step S306), and determines whether or not the facial expression of the subject is a predetermined facial expression, for example a smile (step S307).

When the CPU 700 determines as a result that the facial expression of the subject is not the predetermined facial expression, it returns the process to step S305 to repeat the subsequent processing. In contrast, when the CPU 700 determines that the facial expression is the predetermined facial expression, it advances the process to step S308 in which the CPU 700 generates an imaging signal (step S308) to place the image sensing device in an imaging state. Next, the CPU 700 performs recording processing for the image and sound by transferring the image data used when performing the recognition processing of step S306 and the audio data used when performing the recognition processing of step S302 from the RAM 704 to the EEPROM 705 (step S309).

According to the above processing, since imaging of a subject can be performed with only audio information and image information without, for example, the necessity of an operation such as pressing a shutter button, it is possible to perform imaging of a subject more simply than heretofore.

According to the present embodiment, although the image input unit 709 is first actuated after it is determined in step S303 that a predetermined sentence was uttered, this invention is not limited thereto, and a configuration may be adopted in which the image input unit 709 starts operation together with the start of operation of the speech input unit 707.

Although in this embodiment both images and sound are recorded, a configuration may be adopted in which only one of these is recorded.

Second Embodiment

In this embodiment, the personal recognition mode is selected to shift to the above described preparatory state for imaging, and the bodily motion recognition mode is selected to shift from the preparatory state for imaging to a state of actual imaging.

Figure 11:
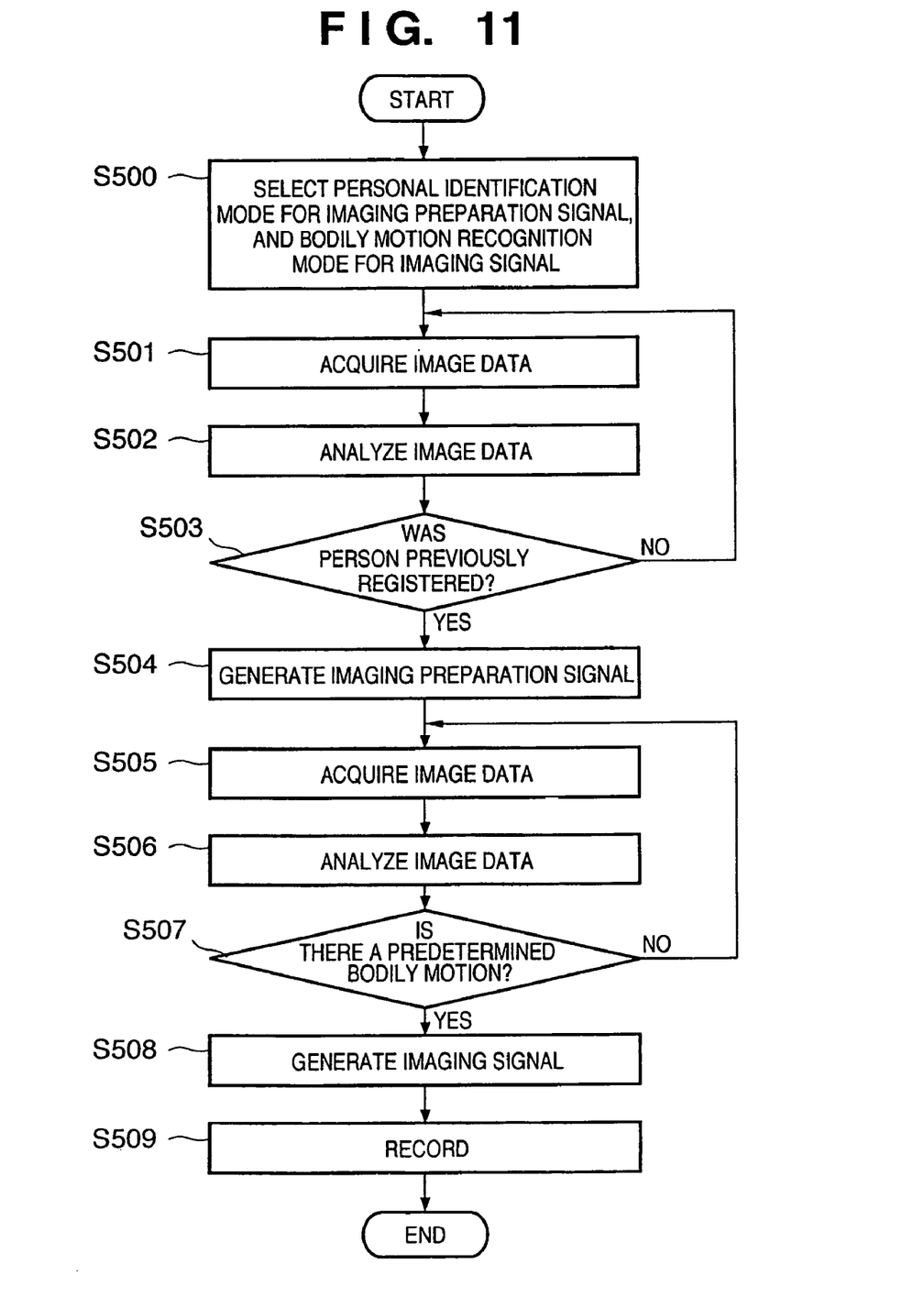
FIG. 11 is a flowchart illustrating .a series of processing that an image sensing device carries out to image a subject.

FIG. 11 is a flowchart illustrating a series of processing operations that the image sensing device carries out to image a subject when these modes are set. Programs and data for causing the CPU 700 to execute processing in accordance with the flowchart of FIG. 11 are stored in the EEPROM 705, and by the CPU 700 using these to carry out processing, the image sensing device according to the present embodiment executes the various processes described hereunder.

When the CPU 700 detects a selection instruction for the aforementioned modes, the CPU 700 temporarily stores the data of each set mode in the RAM 704 (step S500).

Next, since the individual recognition mode is selected, the CPU 700 controls the image input unit 709 to start acquisition of images (step S501). As a result, a dynamic image of real space is input into the image input interface unit 710 as an image signal in frame units from the image input unit 709. The image input interface unit 710 converts this image signal into digital image data and outputs the digital image data to the RAM 704.

The CPU 700 then performs the above described recognition processing for this image data (step S502). In this example, since the personal recognition mode is set, the CPU 700 recognizes which person's face is shown as the face of, the subject in the image (step S502), and determines whether or not this is the face of a predetermined individual (step S503).

When the CPU 700 determines that the face in the image is not a predetermined face, it returns the process to step S501 to repeat the subsequent processing. In contrast, when the CPU 700 determines that the face is a predetermined face, it advances the process to step S504 in which the CPU 700 generates an imaging preparation signal (step S504) to place the image sensing device in a preparatory state for imaging. The process for placing the image sensing device in a preparatory state for imaging is as described above.

Next, the CPU 700 continues to acquire digital image data (step S505), and performs the above described recognition processing on image data that was acquired in the RAM 704. In this case, since the bodily motion recognition mode is set, the CPU 700 recognizes the bodily motion of the subject in the image (step S506) and determines whether or not this is a predetermined bodily motion, for example, a motion to make a peace sign (step S507).

When the CPU 700 determines that the bodily motion in the image is not a predetermined bodily motion, it returns the process to step S505 to repeat the subsequent processing. In contrast, when the CPU 700 determines that the bodily motion is a predetermined bodily motion, it advances the process to step S508 in which the CPU 700 generates an imaging signal (step S508) to place the image sensing device in an imaging state. Next, the CPU 700 performs recording processing for the image by transferring the image data used when performing the recognition processing of step S506 from the RAM 704 to the EEPROM 705 (step S509).

In this connection, when starting operation of the speech input unit 707 at the same time as starting the process of this flowchart, audio data that was acquired at roughly the same time as acquiring the image data used when performing the recognition processing of step S506 may also be recorded on the EEPROM 705.

Further, although in each of the above embodiments a transition to a preparatory state for imaging and a subsequent transition to an imaging state were performed by the CPU 700 by using the respective image information and audio information independently, a configuration may be adopted in which the CPU 700 combines each of these kinds of information to make the transition. For example, individual recognition may be face recognition using images and, in addition, audio speaker recognition may be used together. More specifically, the essence of each of the above described embodiments is that a transition to a preparatory state for imaging and a transition to an imaging state are performed by the CPU 700 using image information and audio information, and there is no particular limitation regarding how they are used.

Other Embodiment

It is to be understood that the objects of the present invention may also be accomplished by supplying a system or apparatus with a recording medium (or storage medium) on which a program code of software, which realizes the functions of the above described embodiments, is recorded, and causing a computer (or CPU or MPU) of the system or apparatus to read out and execute the program code stored on the recording medium. In this case, the program code itself read from the recording medium realizes the functions of the above described embodiments, and hence a recording medium on which the program code is recorded constitutes the present invention.

Further, it is to be understood that the functions of the above described embodiments may be accomplished not only by executing a program code read out by a computer, but also by causing an OS (operating system) or the like, which operates on the computer, to perform a part or all of the actual processing based on instructions of the program code.

Further, it is to be understood that the functions of the above described embodiments may be accomplished by writing a program code read out from the recording medium into a memory provided on a function expansion card inserted into a computer or a memory provided in a function expansion unit connected to the computer and then causing a CPU or the like provided in the function expansion card or the function expansion unit to perform a part or all of the actual processing based on instructions of the program code.

When applying this invention to the above described recording medium, a program code corresponding to the above described flowchart is stored on the recording medium.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-106801, filed on Apr. 1, 2005, which is hereby incorporated by reference herein in its entirety.

What is claimed is:

1. An image sensing device comprising:
    a movie acquisition unit that acquires a movie of a person as an object to be sensed;
    an appearance recognition unit that recognizes an external appearance of the person in the movie acquired by said movie acquisition unit;
    a control unit that controls said image sensing device to place said image sensing device in a preparatory state for sensing, when the recognized external appearance accords with a predetermined external appearance;
    a motion recognition unit that recognizes a bodily motion of the person in the movie acquired by said movie acquisition unit; and
    a sensing unit that senses an image of the person, when the recognized bodily motion accords with a predetermined bodily motion in the preparatory state for sensing.

2. The image sensing device according to claim 1, wherein the external appearance of the person includes a face or facial expression.

3. An image sensing device comprising:
    a speech acquisition unit that acquires speech in a sensing environment;
    a control unit that controls said image sensing device to place said image sensing device in a preparatory state for sensing, when the acquired speech accords with predetermined speech;
    a movie acquisition unit that acquires a movie of an object to be sensed;
    a determination unit that determines whether or not the object fulfills a sensing condition based on an image of each frame of the movie acquired by said movie acquisition unit; and
    a sensing unit that senses an image of the object, when the object fulfills the sensing condition in the preparatory state for sensing.

4. The image sensing device according to claim 3, wherein the predetermined speech represents a predetermined sentence and the sensing condition corresponds to a facial expression of the object, and wherein said sensing unit senses the image of the object, when the facial expression of the object accords with a predetermined facial expression in the preparatory state for sensing.

5. A control method for an image sensing device comprising:
- a movie acquisition step of acquiring a movie of a person as an object to be sensed;
- an appearance recognition step of recognizing an external appearance of the person in the movie acquired by said movie acquisition step
- a control step that controls the image sensing device to place the image sensing device in a preparatory state for sensing when the recognized external appearance accords with a predetermined external appearance
- a motion recognition step that recognizes a bodily motion of the person in the movie acquired by said movie acquisition step; and
- a sensing step that senses an image of the person, when the recognized bodily motion accords with a predetermined bodily motion in the preparatory state for sensing.

6. A control method for an image sensing device comprising:
- a speech acquisition step that acquires speech in a sensing environment;
- a control step that controls the image sensing device to place the image sensing device in a preparatory state for sensing, when the acquired speech acquired in said speech acquisition step accords with predetermined speech;
- a movie acquisition step of acquiring a movie of an object to be sensed;
- a determination step for determining whether or not the object fulfills a sensing condition based on an image of each frame of a movie acquired in said movie acquisition step; and
- a sensing step of sensing an image of the object when the object fulfills the sensing condition in the preparatory state for sensing.

* * * * *